United States Patent
Gandhi et al.

(10) Patent No.: US 10,740,814 B2
(45) Date of Patent: Aug. 11, 2020

(54) DETECTOR TAGS TO DETERMINE PERISHABILITY OF FOOD ITEMS

(71) Applicant: PAYPAL, INC., San Jose, CA (US)

(72) Inventors: Saumil Ashvin Gandhi, Sunnyvale, CA (US); Michael Charles Todasco, Santa Clara, CA (US); Anand Lakshmanan, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 772 days.

(21) Appl. No.: 14/683,058

(22) Filed: Apr. 9, 2015

(65) Prior Publication Data
US 2016/0300285 A1     Oct. 13, 2016

(51) Int. Cl.
*G06Q 30/00*     (2012.01)
*G06Q 30/06*     (2012.01)
*G06K 19/077*     (2006.01)
*G06K 19/07*     (2006.01)

(52) U.S. Cl.
CPC ..... *G06Q 30/0623* (2013.01); *G06K 19/0717* (2013.01); *G06K 19/0723* (2013.01); *G06K 19/07703* (2013.01)

(58) Field of Classification Search
CPC .......... G06Q 30/00–08; G06K 19/0716–0717; G06K 19/0723; G06K 19/07703
See application file for complete search history.

(56) References Cited

U.S. PATENT DOCUMENTS

| 7,248,147 B2 * | 7/2007 | Debord | G01K 3/005 340/309.16 |
| 2007/0176773 A1 * | 8/2007 | Smolander | G01N 29/036 340/539.26 |
| 2011/0029413 A1 * | 2/2011 | Ben-Tzur | G06Q 10/08 705/28 |
| 2014/0156392 A1 * | 6/2014 | Ouimet | G06Q 30/02 705/14.49 |
| 2014/0284239 A1 * | 9/2014 | Espinosa | B65D 81/00 206/459.5 |
| 2016/0162832 A1 * | 6/2016 | Thompson | G06Q 10/0832 705/332 |
| 2018/0005295 A1 * | 1/2018 | Howell | H04Q 9/00 |

OTHER PUBLICATIONS

Perishable Inventory Management and Dynamic Pricing using TTI Technologies. Avi Herbon, Eugene Levner, and Edwin Cheng. International Journal of Innovation, Management and Technology, vol. 3, No. 3, Jun. 2012 (Year: 2012).*

* cited by examiner

*Primary Examiner* — Michael Misiaszek
(74) *Attorney, Agent, or Firm* — Haynes and Boone, LLP

(57) ABSTRACT

There are provided systems and methods for detect tags to determine perishability of food items. A merchant may utilize detector tags on, attached to, or otherwise associated with perishable items to detect conditions of the perishable items. For example, the detector tags may determine chemical properties, ambient light levels, temperatures, or other conditions for or around the perishable items. The conditions may be communicated by the tags to a user's device or the merchant's device. Where the conditions indicate that one or more of the perishable items are ready for consumption, the user may be alerted of a state of the perishable item, such as ready or ripe. The user may further be informed of where to find the perishable item in the merchant's location. However, if the perishable item has gone bad, the user and/or merchant may be warned about the item to prevent health issues.

20 Claims, 6 Drawing Sheets

DETECTOR TAGS TO DETERMINE PERISHABILITY OF FOOD ITEMS

TECHNICAL FIELD

The present application generally relates to detector tags to determine perishability of food items and more specifically to utilizing a hardware detector tag affixed or in proximity to a perishable item to detect conditions of the perishable item and alert a user to the items physical state related to consumption of the item.

BACKGROUND

At various merchant locations, such as a merchant grocery store, meat/produce store, liquor store, or even hardware store, the merchant may offer for sale items that may require maturation or may eventually expire. For example, perishable items may have a limited shelf life before the item is no longer acceptable for consumption or useful. Moreover, such items may be required to mature when arriving at the merchant location (e.g., unripe fruit at a grocery store). However, a user shopping for items at the store may not know what items are potentially good or bad without examining each individual item. Additionally, the user may not be able to correctly examine the contents of certain items that may spoil or turn, such as alcoholic beverages, certain fruits, and meats. The user may also wish to have items that mature in a certain amount of time to account for storing the item after the user purchases the item. The user may view expiration dates, "sell by" dates, and/or dates the perishable items have been offered for sale, but the dates may not reflect improper storage conditions or other environmental factors that may affect the perishable items. The merchant may also wish to know whether their storage of the perishable items has been compromised to prevent damage to the item and/or inventory and monetary losses.

Figure 1:
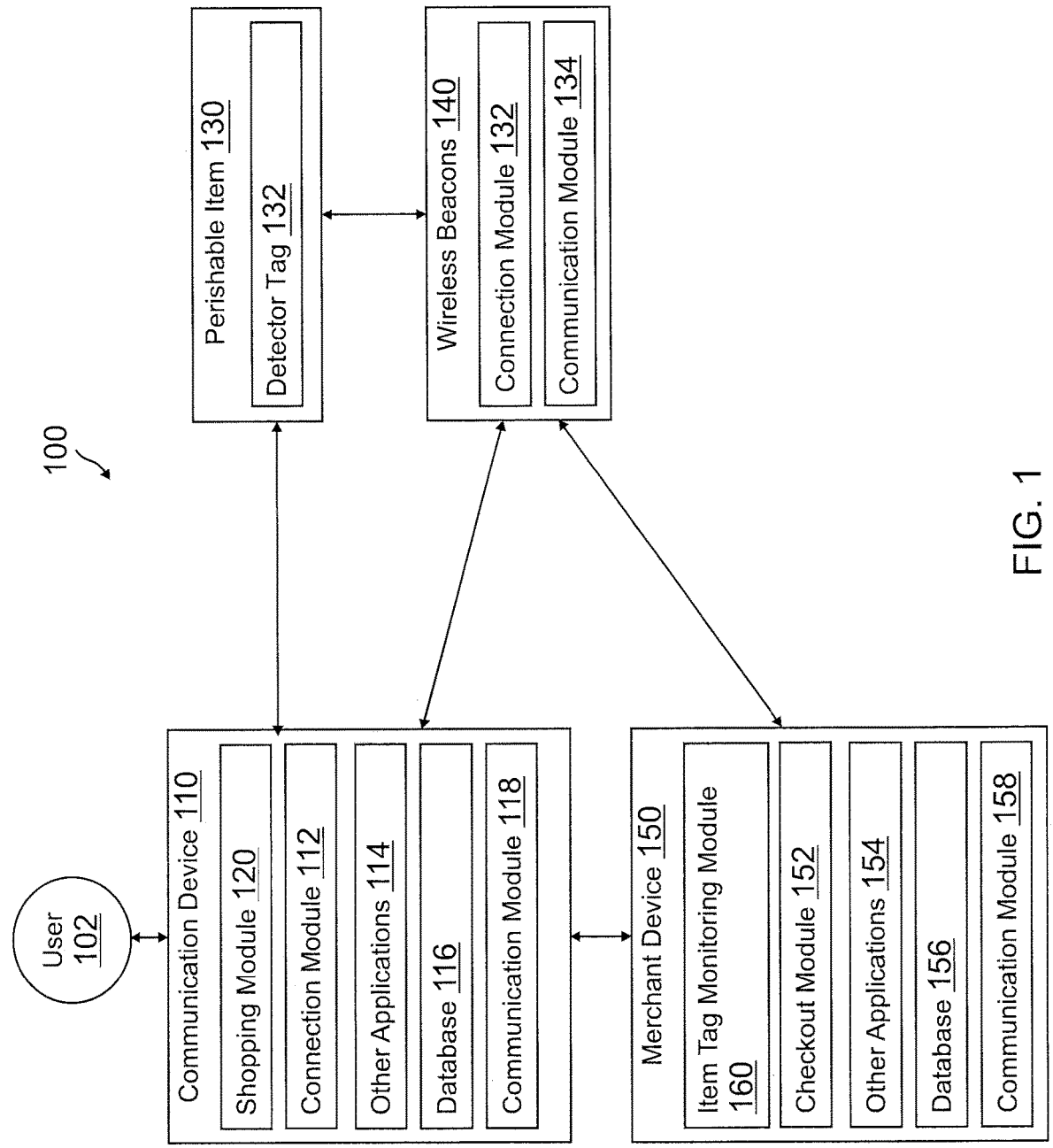
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide detector tags to determine perishability of food items. Systems suitable for practicing methods of the present disclosure are also provided.

Various merchant locations may provide short range wireless communications with a device for a user (e.g., a consumer or purchaser at a merchant location), such as through beacons using one or more of Bluetooth Low Energy (BLE) communication protocol, LTE Direct communication protocol, WiFi communication protocol, etc. These beacons may be set up at a location and communicate with devices to alert users of check-in services through their device. The beacons may provide additional functionality, such as establishing a connection with a merchant device and/or server to communicate information to the merchant from the beacon and/or complete transactions between the merchant and the user. The beacons may communicate with the devices directly, including information stored in the beacons. The beacons may also allow the user's device to communicate with a device or server attached to, or in communication with, the beacon, such as a device or server of a merchant.

A merchant's location may also utilize detector tags with one or more goods or products, such as food/drink, referred to herein as an "item" or "items." The item(s) may correspond to a perishable item for sale at the merchant's location. Perishable items may correspond to food items, such as fruits, vegetables, meats, breads, dairy products, etc., plants, flowers, drinks, such as milk, alcoholic beverages, and/or juices. Although it is referred to herein as a "perishable item," the "perishable item" may correspond to any perishable matter, including medicine, fluids and synthetics, or other matters that may degrade or perish after a limited lifetime. The detector tags may correspond to a small hardware device that may detect a condition of the item or items. For example, the detector tag may include a chemical sensor, a light sensor, a thermometer or other temperature sensor, a pressure gauge, a timer, a combination of the aforementioned sensors, or another type of sensor. The sensor may allow the detector tag to determine one or more of a chemical reading, a temperature reading, a pressure reading, a light reading, a hardness reading, and an amount of time. The detector tag may include modules to record the condition of the item or items, for example, in a memory, or the sensor may affect the detector tag so that the detector tag notes the detected condition of the item(s) (e.g., by affecting an antenna of a communication module of the detector tag).

In various embodiments, the detector tag may also include an indicator, such as an interface or LED light, or the detector tag may include another display process (e.g., changing color of the detector tag or the sensor) that may alert a user viewing the detector tag to a state of the item(s) determined using the detected condition of the item(s). For example, the state may correspond to unready, unripe, ready, ripe, prepared, spoiled, bad, dangerous, contaminated, or other state related to a perishability of the item(s). The indicator may present the state to a buyer and/or merchant when the buyer/merchant views the detector tag. However, in other embodiments, the detector tag does not require an indicator, and instead may communicate the condition information to a device for determination of the item(s)'s state and presentation of a notification about the item(s)'s state to a user (e.g., the buyer or merchant)

Thus, the detector tag may also include a communication module that may communicate the condition information to another device, such as a communication device in possession of a user (e.g., a buyer at a merchant location) and/or a merchant device for a merchant or employee at the merchant location. The communication module of the detector tag may also communicate the information to a wireless beacon established at the merchant location or at a sub-location within the merchant location (e.g., nearby the perishable item). The communication module of the detector tag may be active or passive. For example, the detector tag may correspond to an RFID tag that may have an active antenna powered by a power source that actively transmits data to the device/beacon, such as the condition information, or utilizes the power source to communicate the data to the device/beacon in response to query by the device for the data. The tag may also correspond to another wireless beacon, for example, a beacon utilizing short range wireless communications to communicate the condition information to one or more of the user's communication device, the merchant device, and/or the wireless beacon. In such embodiments, the detector tag may communicate with the devices/other beacons established in the merchant location using one of near field communication, radio communication, infrared communication, Bluetooth communication, Bluetooth Low Energy (BLE) communication, LTE Direct communication, and WiFi communication. In other embodiments, the RFID tag may have a passive antenna that receives a query (e.g., a radio frequency (RF) query) for data from a device/beacon and utilizes the energy of the RF query to communicate the condition information to the querying device/beacon.

Where the merchant's location utilizes the aforementioned wireless beacons at a merchant location, the wireless beacons may receive the condition information from the detector tag. A merchant's location may correspond to a retail store, a shopping market, a mall location, or other physical location where a user, such as a consumer or purchaser, may visit to purchase items. The merchant may utilize the short range wireless beacons at the merchant's location to communicate with a device of the user. For example, the short range wireless beacons may be established throughout the merchant location, such as sub-locations having a type or category of items to purchase. A sub-location in a shopping market may correspond to a bakery section, a deli section, a produce section, a dairy section, a floral section, or other section of the market. The beacons may employ BLE, LTE Direct, WiFi, or other communications that emit a signal receivable by the user's device. The communication may include an identifier for the beacon, the user, the merchant, and/or a service provider.

A user may set up their communication device to passively monitor for BLE, LTE Direct, WiFi, or other communication signals from the beacon. When the communication device detects the signal and verifies the one or more identifiers, both the communication device and the beacon may ramp up in power and establish a connection, where the connection may further enable the communication device to communicate with the merchant. The connection may be completed automatically when the communication device is in range of the beacon, or may be completed after prompting the user to check-in when the communication device is in range of the beacon. The beacon may provide information to the user's communication device, such as the condition information received from the detector tag. The beacon may also provide the condition information to a merchant device for the merchant and/or a merchant employee at the merchant's location.

Thus, the user's communication device may receive the condition information for the perishable item(s) for processing (e.g., from the detector tag directly or routed through the wireless beacon). The communication device may execute one or more specialized modules to determine a state of the perishable item(s) using the condition information. For example, similar to the detector tag, the communication device may receive information on the perishability of an item and determine a rating or state of the item related to the item's perishability (e.g., ripe, unripe, etc.). The state of the item may be related to whether the item is consumable, dangerous, contaminated, and/or spoiled. The communication device may prepare a notification for the user using the state of the perishable item(s). The notification may alert the user if the item is ready for purchase or consumption, how long until the item is ready for purchase or consumption, whether the item is bad, dangerous, and/or contaminated, or other information about the state of the item. Moreover, the user may be alerted of where the item is and/or identification of the item (e.g., an item barcode, alphanumeric code, QR code, name, number, or other identifier).

The communication device may also compare the perishable item corresponding to the condition information to a list of preferred or desired items by the user, for example, a shopping list or list of commonly purchased items while at the merchant location. The communication device may filter condition information from items not on the list so that the user only receives notifications for states of perishable items on the list. The detector tag may continue working after the item has been purchased by the user so that the user may be informed of the item's state after purchase. For example, the user may bring a tuna sandwich to work from a market, but be alerted that the sandwich is no longer good due to improper storage if the sandwich was left on a desk at work. Similarly, fruit brought home may ripen in a few days after purchase, where the detector tag informs the user when the fruit is ripe.

Moreover, the merchant's device may receive the condition information and similarly process the condition information to determine a state of the perishable item(s). The merchant's device may execute a specialized module that displays a list of multiple states for multiple perishable item(s) so that the merchant may monitor perishable items and prevent waste of food or sale of unsafe items. The merchant's device may also display the condition information for the state, such as a detected temperature, pressure, or other information so that the merchant may be informed of potential causes for damage to the perishable item(s). Additionally, the merchant's device may generate a notification using the state that may notify the merchant and/or a merchant employee of certain states of perishable items. Thus, ripe or ready food may be placed in the front of a display, bad or unsafe food may be removed from a display, and the merchant may utilize the notifications to offer specials to customers or inform customers of ready to consume food, for example, through advertisements to the consumer's communication device from the merchant device and through the wireless beacons at the merchant's location. Incentives may also be provided for overripe or items about to expire or perish.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a detector tag 132 for a perishable item 130, wireless beacons 140, and a merchant device 150 in communication directly using short range wireless communications and/or over a network. User 102, such as a consumer or other shopper at a merchant location, may arrive at the merchant location where the merchant associated with merchant device 150 may offer perishable item 130 for sale. User 102 may receive notifications about perishable item 130, such as a state of perishable item 130, while at the merchant location based on detected conditions of perishable item 130 by detector tag 132. Such condition information may be transmitted to communication device 110 by detector tag 132 and/or wireless beacons 140. Additionally, the merchant may view the state of perishable item 130 and/or a notification about perishable item 130 using merchant device 150.

Communication device 110, wireless beacons 140, and merchant device 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over a network.

Communication device 110 may be implemented using any appropriate hardware and software configured for wired and/or wireless communication with detector tag 132, wireless beacons 140, and/or merchant device 150. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a shopping module 120, connection module 112, other applications 114, a database 116, and a communication module 118. Shopping module 120, connection module 112, and other applications 114 may correspond to executable processes, procedures, and/or applications with associated hardware. In other embodiments, communication device 110 may include additional or different software as required.

Shopping module 120 may correspond to one or more processes to execute modules and associated devices of communication device 110 to access condition information for perishable item 130, process the condition information to determine a state of perishable item 130, and generate a notification for user 102 regarding the perishable item and the state of the perishable item. In this regard, shopping module 120 may correspond to specialized hardware and/or software utilized by communication device 110 to access condition information detected and/or collected by one or more detector tags (e.g., detector tag 132) affixed to, placed on, or otherwise associated with one or more perishable items (e.g., perishable item 130), as discussed herein. Once shopping module 120 accesses condition information, shopping module 120 may process the condition information to determine a state of the perishable item(s). The state may be utilized to further generate a notification to user 102 that may alert user 102 of the perishable item and the state of the perishable item so that user 102 may decide whether to purchase, consume, or utilize the perishable item(s).

For example, condition information for perishable item 130 may correspond to chemical information and/or detection for perishable item 130. Various types of fruit may release ethylene as the fruit matures to a ripe state where the fruit is consumable or best consumed. Thus, detector tag 132 may detect the presence or increased presence of ethylene, as discussed herein. In other embodiments, detector tag 132 may detect other parameters of perishable item 130, such as other chemicals, ambient light perishable item 130 is exposed to, temperature of perishable item 130, hardness or pressure readings of perishable item 130, and/or a time associated with perishable item 130 (e.g., since creation, offer for sale, countdown to an expiration date, or other amount of time). Shopping module 120 may process the condition information to determine the state of perishable item 130, such as immature, unready, unripe, mature, ready, ripe, expired, spoiled, dangerous, and/or contaminated. Shopping module 120 may process the condition information using generalized guidelines on perishability of items, settings by user 102 for acceptable perishable items, user preferences (user-set or determined from user history) for perishable item 130, and/or known information about the specific item, type of item, or brand of item that perishable item 130 belongs to.

Once shopping module 120 determines a state of perishable item 130, shopping module 120 may generate a notification to user 102 regarding perishable item 130 and/or the state of perishable item 130. A notification to user 102 may be generated that informs user 102 of perishable item 130's identification (e.g., a name, identifier, bar/QR/alphanumeric code, number, etc.). The notification may further include the state of perishable item 130, such as ripe, unripe, or spoiled. The notification may also include a description of perishable item 130 as well as where perishable item 130 may be found with the merchant location corresponding to perishable item 130. In various embodiments, shopping module 120 may only generate the notification if perishable item 130 is consumable or usable at present time and/or in the future. User 102 may set preferences with shopping module 120 to regulate notifications regarding perishable items.

In various embodiments, user 102 may utilize shopping module 120 to enter a shopping list, select desired items, or otherwise indicate preferences for one or more items while shopping. Selection of preferred items may allow shopping module 120 to only provide notifications for perishable items within the list of preferred items. Thus, if perishable item 130 is included within the list, user 102 may receive a notification, while if perishable item 130 is not within the list, notifications for perishable item 130 may be omitted.

Moreover, user 102 may choose to only receive notifications for preferred items if the preferred items are ready for use/consumption. User 102 may set a time period using shopping module 120 for when perishable item 130 may be ready for use/consumption. Thus, if user 102 would like to purchase meat for use in 5 days or fruit that is ripe in 3 days, items matching those parameters may be presented to user 102 using the notifications. Shopping module 120 may also receive incentives to purchase items, for example, from merchant device 150, as will be explained herein.

In various embodiments, shopping module 120 may further receive condition information for items already purchased and/or in possession of user 102. For example, user 102 may purchase red wine as perishable item 130 that should not be left in sunlight. Thus, if user 102 brings home perishable item 130 but leaves perishable item 130 in direct sunlight, shopping module 120 may notify user 102 that perishable item 130 should be moved using condition information detected by detector tag 132, as discussed herein. In other embodiments, shopping module 120 may notify user when perishable item 130 is reaching a "best by" date, expiration date, or other important time based on condition information detected while perishable item 130 is in possession of user 102 (e.g., taken home for later consumption). Shopping module 120 may also inform user 102 when perishable item 130 is no longer good, safe, or consumable.

Connection module 112 may correspond to one or more processes to execute modules and associated devices of communication device 110 to establish a connection with detector tag 132 at a merchant location for merchant device 150 (e.g., a grocery store, retail location, storefront, etc.) and/or one or more of wireless beacons 140 established throughout the merchant location. In this regard, connection module 112 may be configured to connect to one or more of wireless beacons 140 in order to receive condition information communicated to one or more of wireless beacons 140 by detector tag 132. Connection module 112 may receive short range wireless communications from wireless beacons 140 and/or detector tag 132 at the merchant location and transmit information to wireless beacons 140 and/or detector tag 132, including check-in information for a check-in process with merchant device 150. For example, the location for one or more of wireless beacons 140 may correspond to a sub-location within the merchant location, such as a produce aisle of a grocery store, an electronics section of a retail store, a bedding section of a home goods store, or other sub-area having a description or item/service type within a larger merchant location. In such an example, wireless beacons 140 may be range limited to correspond only to the sub-location, and a plurality of other wireless beacons may be distributed throughout the merchant location, each capable of uniquely connecting to communication device 110. Wireless beacons 140 may be set to be range limited to the sub-locations, or may be limited to the room by virtue of merchant location (e.g., walls, dividers, spacing, etc.). Thus, connection module 112 may transmit information to one or more of wireless beacons 140 when user 102 is nearby the one or more of wireless beacons 140 enabling wireless beacons 140 to only communicate condition information for perishable items in proximity to user 102 and the wireless beacon of wireless beacons 140 connected to communication device 110. Similarly, detector tag 132 may only connect to devices within a certain distance or proximity to detector tag 132.

Connection module 112 may execute in the background of an operating system of communication device 110 and be configured to establish connections, using communication module 118 of communication device 110, with one or more of wireless beacons 140 and/or detector tag 132. The connection may be established with or without user input from user 102. For example, wireless beacons 140 and/or detector tag 132 may broadcast a token, such as a universally unique identifier (UUID), for reception by connection module 112, as will be explained in more detail herein. Connection module 112 may utilize communication module 118 of communication device 110 to receive the token. If connection module 112 acknowledges the UUID as identifying detector tag 132, wireless beacons 140, and/or merchant device 150 (e.g., if connection module 112 determines the UUID corresponds to a request to complete a check-in), connection module 112 may transmit an identifier corresponding to user 102 and/or communication device 110 back to the one or more of wireless beacons 140 and/or detector tag 132 transmitting the first identifier. Connection module 112 may utilize communication module 118 of communication device 110 to communicate with one or more of wireless beacons 140 and/or detector tag 132 (e.g., over near field communication, Bluetooth, Bluetooth Low Energy, radio, infrared, LTE Direct, or other connection). The identifier from communication device 110 may include, be transmitted with, concatenated with, or otherwise bundled with the identifier received from the one or more of wireless beacons 140 and/or detector tag 132 transmitting the first identifier. In other embodiments, different information may be transmitted to wireless beacons 140 and/or detector tag 132, such as a name or other personal information for user 102. Thus, the information transmitted to wireless beacons 140 does not need to be utilized to process and/or complete a check-in with merchant device 150 in all embodiments.

In various embodiments, detector tag 132 may include an RFID tag or other type of hardware tag. In such embodiments, connection module 112 may query detector tag 132 for the condition information. Where detector tag 132 includes a passive antenna, connection module 112 may utilize communication device 110 as a reader and communicate a RF query utilized by detector tag 132 to respond to the query with condition information (e.g., as an RFID reader). Once a connection is established with connection module 112, one or more of wireless beacons 140 and/or detector tag 132 may communicate information to communicate device 110, such as condition information for processing by shopping module 120.

In various embodiments, one or more features of shopping module 120 and/or connection module 112 may be incorporated in the same application so as to provide their respective features in one application.

Communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over a network, or other types of applications. Other applications 114 may also include email, texting, voice and IM applications that allow a user to send and receive emails, calls, texts, and other notifications through a network. In various embodiments, other applications 114 may include financial applications, such as banking, online payments, money transfer, or other applications associated with a payment provider server. Other applications 114 may include browser, social networking, and/or mapping applications, which may also be used in conjunction with connection module 112 and/or shopping module 120. Other applications 114 may contain software programs, executable by a processor, including a graphical user interface (GUI) configured to provide an interface to the user.

Communication device 110 may further include database 116 which may include, for example, identifiers such as operating system registry entries, cookies associated with shopping module 120, connection module 112, and/or other applications 114, identifiers associated with hardware of communication device 110, or other appropriate identifiers, such as identifiers used for payment/user/device authentication or identification. Identifiers in database 116 may be used by a payment/credit provider to associate communication device 110 with a particular account maintained by the payment/credit provider. Database 116 may include communication device tokens and/or encryption keys, including an encryption key of detector tag 132, wireless beacons 140, and/or merchant device 150. Database 116 may include received information, such as condition information for perishable item 130. Additionally, information determined by shopping module 120 may be stored to database 116, such as one or more states of perishable item 130 and notifications for perishable item 130 and/or other perishable items.

Communication device 110 includes at least one communication module 118 adapted to communicate with detector tag 132, wireless beacons 140, and/or merchant device 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with detector tag 132 and/or wireless beacons 140 using short range communications, such as Bluetooth Low Energy, LTE Direct, radio frequency, infrared, Bluetooth, and near field communications.

Perishable item 130 may correspond to an item having a limited lifespan, shelf life, and/or other limited availability or use factor. In this regard, perishable item 130 may correspond to a food or drink item (including live food that may require consumption in a limited timespan), a medicine or other chemical, a limited use item for a particular time or event, or other type of limited use item, such as plants or flowers. Perishable item 130 may be offered for sale at a merchant location associated with merchant device 150. Perishable item 130 may have one or more conditions, or may be exposed to one or more conditions in a surround environment. Additionally, perishable item 130 may include detector tag 132, which may detect such conditions.

Detector tag 132 may correspond to a hardware device that may detect one or more conditions for, associated with, surrounds, or otherwise affecting perishable item 130. In this regard, detector tag 132 may include one or more sensors that may detect the condition and generate condition information. The sensors may detect chemicals, temperature, pressure, hardness, ambient light, or other physical parameter. The sensor may also include a timer. Thus, the sensor may correspond to a chemical sensor, a thermometer, thermistor, or other temperature sensor, a pressure sensor, a light sensor, and/or a time. The sensor may provide sensor data (e.g., condition information) to detector tag 132 for communication to one or more other devices/beacons. However, in other embodiments, the sensor may affect detector tag 132, such as cause a change in color, shape, sound, or presentation, or a change in an antenna and antenna response or wavelength of response, or other change corresponding to the condition. Thus, detector tag 132 may further include an indicator and/or a communication module. The communication module may be active and include a power source to communicate the condition information actively or in response to a query, or may be passive and respond only to RF or other queries of sufficient signal strength.

Wireless beacons 140 may be maintained, for example, by a merchant for merchant device 150. Wireless beacons 140 may be implemented using any appropriate hardware and software configured for wireless communication with communication device 110 and/or merchant device 150. For example, in one embodiment, wireless beacons 140 may be implemented as a dongle device including a hardware processor and a communication module, for example, connected to device at the location of the merchant. Wireless beacons 140 may also be implemented as a device incorporated within a personal computer (PC), a smart phone, laptop/tablet computer, and/or other types of computing devices capable of transmitting and/or receiving data. Wireless beacons 140 may also act as a stand-alone device including a processor, communication module, and/or network interface component configured to communicate with communication device 110 and/or merchant device 150. Although wireless beacons 140 are described as a plurality of wireless beacons set up at sub-locations within a merchant location for merchant device 150, in various embodiments, wireless beacons 140 may correspond to a single wireless beacon established at the merchant location and/or a sub-location within the merchant location.

Wireless beacons 140 may be located at a physical location corresponding to merchant device 150 (e.g., a merchant location, such as a grocery store, shopping market, retail location, merchant storefront, etc.). Each of wireless beacons 140 may be established at sub-locations located throughout the merchant location. For example, one or more of wireless beacons 140 may be established in an area corresponding to a specific type of item or items available at the merchant location (e.g., a perishable item type, such as food type, consumer good type, etc.). Each of wireless beacons 140 may be further range limited to connect to devices within the sub-location. Wireless beacons 140 of FIG. 1 contains processes, procedures, and/or applications executable by a hardware processor, for example, a software program, configured to interact with communication device 110, detector tag 132, and/or merchant device 150. Thus, regardless of the implementation of wireless beacons 140, as discussed above, each of wireless beacons 140 utilize a connection module 132 and a communication module 134. In other embodiments, wireless beacons 140 may include additional or different software and devices as required.

Connection module 132 may correspond to an application for transmitting requests to establish a connection between a device (e.g., communication device 110 and/or merchant device 150) and one of wireless beacons 140. The requests may be unique to each of wireless beacons 140 and form a connection with only the matching one of wireless beacons 140. Thus, wireless beacons 140 may utilize short range wireless communications (e.g., BLE, LTE Direct, WiFi, etc.) of wireless beacons 140 to transmit the requests to establish a connection, including an identifier such as a Universally Unique Identifier (UUID). If communication device 110 and/or merchant device 150 receives a request to establish the connection with wireless beacons 140 and responds with an identifier for user 102/communication device 110/the merchant/merchant device 150 (potentially including the UUID and other information necessary to effectuate a check-in for user 102), wireless beacons 140 to ramp up in power and create a connection between communication device 110/merchant device 150 and one of wireless beacons 140.

Each of wireless beacons 140 may uniquely transmit the request to establish the connection with wireless beacons 140 as a short range wireless communication (e.g. a BLE protocol communication) including a "wake up" process and/or a token for the one of wireless beacons 140 transmitting the request. In other embodiments, the request and/or connection may utilize near field communication, radio communication, infrared communication, or Bluetooth communication. Additionally, although wireless beacons 140 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacons 140 (e.g., communication device 110 and/or merchant device 150) and establishment of a connection for data transfers.

Communication device 110/merchant device 150 may only pick up the request based on the signal range and/or physical context for one of wireless beacons 140 transmitting the request within the sub-location. For example, one of wireless beacons 140 established in a sub-location of a merchant location and may be limited in range only to connect to communication device 110/merchant device 150 if communication device 110/merchant device 150 is located in the sub-location. In various embodiments, wireless beacon 140 and merchant device 150 may also be connected at the merchant location, for example, through short range wireless communication and/or a wired or wireless connection with merchant device 150 (e.g., over a network).

After connection module 132 receives an identifier from communication device 110/merchant device 150, connection module 132 may determine user 102/the merchant is in proximity to the wireless beacon of wireless beacons 140 receiving the identifier. Additionally, connection module 132 may cause wireless beacons 140 to keep a communication channel open between communication device 110 and/or merchant device 150 for passing additional information, such as condition information for perishable item 130. Connection module 132 may also be utilized to receive the connection information from detector tag 132. For example, connection module 132 may generate a query signal, which requests the condition information from detector tag 132.

In various embodiments, wireless beacons 140 includes at least one communication module 134 adapted to communicate with communication device 110, detector tag 132, and/or merchant device 150. Communication module 134 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 134 may communicate with communication device 110, detector tag 132, and/or merchant device 150 using short range communications, such as radio frequency, infrared, Bluetooth, and near field communications.

Merchant device 150 may be implemented using any appropriate hardware and software configured for wired and/or wireless communication with communication device 110, detector tag 132, wireless beacons 140. For example, merchant device 150 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a merchant device is shown, the merchant device may be managed or controlled by any suitable processing device. Although only one merchant device is shown, a plurality of merchant devices may function similarly, for example, possession of one or more merchants or merchant employees at a merchant location.

Merchant device 150 of FIG. 1 contains an item tag monitoring module 160, a checkout module 152, other applications 154, a database 156, and a communication module 158. Item tag monitoring module 160, checkout module 152 and other applications 154 may correspond to processes, procedures, and/or applications executable by a hardware processor, for example, a software program. In other embodiments, merchant device 150 may include additional or different software as required.

Item tag monitoring module 160 may correspond to one or more processes to execute modules and associated devices of merchant device 150 to access condition information for perishable item 130, process the condition information to determine a state of perishable item 130, and generate a notification for a merchant corresponding to merchant device 150 regarding the perishable item and the state of the perishable item. Similar to shopping module 120, in this regard, item tag monitoring module 160 may correspond to specialized hardware and/or software utilized by merchant device 150 to access condition information detected and/or collected by one or more detector tags (e.g., detector tag 132) affixed to, placed on, or otherwise associated with one or more perishable items (e.g., perishable item 130), as discussed herein. Once item tag monitoring module 160 accesses condition information, item tag monitoring module 160 may process the condition information to determine a state of the perishable item(s). The state may be utilized to further generate a notification to the merchant that may alert the merchant of the perishable item and the state of the perishable item so that the merchant can offer perishable item 130 for sale or discount when perishable item 130 is ready of consumption or an expiration date is upcoming, remove perishable item 130 from sale when perishable item 130 is no longer ready for consumption, and/or monitor conditions of perishable item 130 to prevent unnecessary spoiling and waste of perishable item 130.

For example, item tag monitoring module 160 may receive condition information as discussed herein, which may include a chemical, physical, environmental, or other condition for perishable item 160 (e.g. some condition that results from a state of perishable item 160, such as unripe, ripe, or spoiled). Item tag monitoring module 160 may determine the state of perishable item 130 using such information in a similar manner to shopping module 120 discussed herein. Once a state is determined for perishable item 130, item tag monitoring module 160 may populate a table, list, or other informational element(s) displayed in an interface of merchant device 150 with the state of perishable item 130. Information displayed through item tag monitoring module 160 may include names of one or more perishable items and their corresponding states. Thus, the merchant or merchant employee viewing the information through item tag monitoring module 160 may view states of perishable items in order to make decisions about the perishable items based on their states. For example, a perishable item that is not ready may be placed in a stockroom or in the back of a display unit, while perishable items that are ready may be more prominently displayed (e.g., at the front of a display case). Perishable items approaching a "sell by" or other expiration date may be placed on sale or otherwise discounted. The merchant and/or merchant employee may also remove expired, bad, contaminated, or otherwise undesirable items from display cases. Item tag monitoring module 160 may also display the conditions causing the state for each perishable item. For example, if perishable item 130 has gone bad due to improper refrigeration, item tag monitoring module 160 may display the condition so that the merchant or merchant employee may fix the undesirable condition.

Item tag monitoring module 160 may also generate notifications from one or more perishable items depending on their states. A merchant or merchant employee viewing an interface for item tag monitoring module 160 may view the notifications. A notification may include the name/type of perishable item, an identifier for the perishable item, and/or the state of the perishable item (e.g., perishable item 130). Item tag monitoring module 160 may generate the notification where the state of perishable item 130 requires attention. For example, if perishable item 130 has expired, a notification may be generated to remove perishable item 130 from sale. Similarly, a notification may be generated where perishable item 130 is about to expire and may optionally be sold at a reduced price to incentive users to purchase perishable item 130 and use/consumer. The notification may further include a discount, benefit, or other information for use with perishable item 130 when sold.

Checkout module 152 may correspond to one or more processes to execute modules and associated devices of merchant device 150 to provide a convenient interface to permit a merchant for merchant device 150 to enter, view, and/or process items/services user 102 wishes to purchase. In this regard, checkout module 152 may correspond to specialized hardware and/or software utilized by merchant device 150 that may be implemented as an application having a user interface enabling the merchant to enter the items user 102 has selected for purchase (e.g., through input by the merchant and/or user 102, scanning the items, etc.). Checkout module 152 may further enable the merchant to view the items for purchase by user 102, enter coupons and/or discounts for the items, edit the order including adding, removing, and/or modifying items, or other functions with regards the selected items/services. Once the items have been arranged into an order for purchase by user 102, a total may be calculated and a transaction may be engaged with user 102 to complete payment for the selected items. Checkout module 152 may request payment covering the selected items from user 102. Thus, checkout module 152 may receive a payment instrument from user 102 to complete a transaction for the selected items. The payment instrument may correspond to cash, payment cards, checks, and/or payment accounts with a payment provider server, in various embodiments. Once a transaction is processed and/or completed by checkout module 152 for the selected items by user 102, a transaction history (e.g., receipt) may be generated and provided to one or more of user 102, communication device 110, and/or the payment provider server.

Merchant device 150 includes other applications 154 as may be desired in particular embodiments to provide features to merchant device 150. For example, other applications 154 may include security applications for implementing client-side security features, programmatic client applications for interfacing with appropriate application programming interfaces (APIs) over a network, or other types of applications. In various embodiments, other applications 154 may include financial applications, such as banking, online payments, money transfer, or other applications associated with a payment provider server. Other applications 154 may contain other software programs, executable by a processor, including a graphical user interface (GUI) configured to provide an interface to the user.

Merchant device 150 may further include database 156 which may include, for example, identifiers such as operating system registry entries, cookies associated with item tag monitoring module 160, checkout module 152, and/or other applications 154, identifiers associated with hardware of merchant device 150, or other appropriate identifiers, such as identifiers used for payment/user/device authentication or identification. Database 156 may also store user 102's information, including check-in information, an identifier, etc., for user 102. Database 156 may include payment instruments, past transaction histories, expected checkout times, and/or other past information for user 102. Database 156 may also store received information, such as condition information for perishable item 130, and information determined by one or more of item tag monitoring module 160 and checkout module 152.

Merchant device 150 includes at least one communication module 158 adapted to communicate with communication device 110, detector tag 132, and/or wireless beacons 140. In various embodiments, communication module 158 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 158 may communicate directly with wireless beacons 140 using short range communications, such as Bluetooth Low Energy, LTE Direct, radio frequency, infrared, Bluetooth, and near field communications.

As discussed herein, communication device 110, detector tag 132, wireless beacons 140, and/or merchant device 150 may communicate using short range wireless communications or may communicate using a network. The network may be implemented as a single network or a combination of multiple networks. For example, in various embodiments, the network may include the Internet or one or more intranets, landline networks, wireless networks, and/or other appropriate types of networks. Thus, the network may correspond to small scale communication networks, such as a private or local area network, or a larger scale network, such as a wide area network or the Internet, accessible by the various components of system 100.

Figure 2:
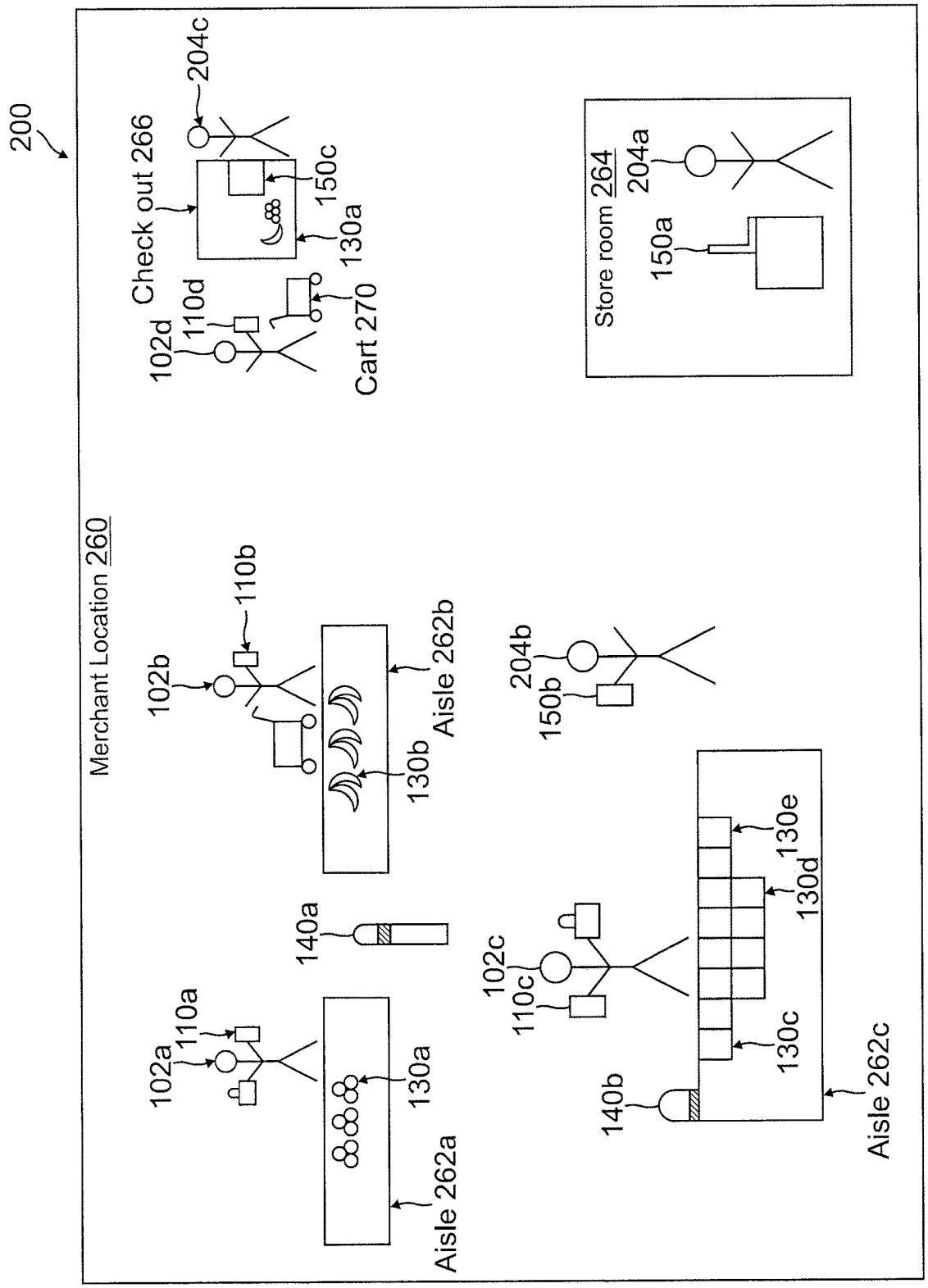
FIG. 2 is an exemplary merchant environment with users receiving notifications for perishable items while browsing items in the merchant environment, according to an embodiment.

FIG. 2 is an exemplary merchant environment with users receiving notifications for perishable items while browsing items in the merchant environment, according to an embodiment. Environment 200 of FIG. 2 includes a user 202a utilizing a communication device 210a, a user 202b utilizing a communication device 210b, a user 202c utilizing a communication device 210c, and a user 202d utilizing a communication device 210d all corresponding generally to user 102 utilizing communication device 110, respectively, of FIG. 1. Environment 200 further includes a perishable item 130a, a perishable item 130b, a perishable item 130c, a perishable item 130d, a perishable item 130e, and a perishable item 130f all corresponding generally to perishable item 130 having detector tag 132 of FIG. 1. Environment 200 further includes a wireless beacon 140a and a wireless beacon 140b both corresponding generally to wireless beacon 140 off FIG. 1. Moreover, environment 200 includes a merchant device 150a, a merchant device 150b, and a merchant device 150c both corresponding generally to merchant device 150 of FIG. 1.

Environment 200 includes a merchant location 260 where users 202a-d may browse perishable items 130a-f for sale from a merchant, such as through items in aisle 262a, an aisle 262b, and an aisle 262c. While at merchant location 260, users 202a-d may receive notifications on their respective communication device 110a-d about perishable items 130a-f. For example, users 202a and 202b are browsing aisles 262a and 262b for produce items, such as perishable items 130a and 103b. Perishable item 130a may not be ripe yet. Thus, as user 202a approaches aisle 262a, user 202a may receive a notification on communication device 110a that perishable item 130a is not ready for consumption. A detector tag on perishable item 130a may communicate condition information for perishable item 130a, for example, when communication device 110a is in nearby perishable item 130. In other embodiments, wireless beacon 140a may provide the condition information to communication device 110a when communication device 110a is within a certain distance of wireless beacon 140a and may connect to wireless beacon 140a. However, perishable item 130b may be ready for consumption. Thus, user 202b may be notified on communication device 110b that perishable item 130b is ready for purchase and consumption. Similarly, a detector tag or wireless beacon 140a may provide the condition information for perishable item 130b in aisle 262b, which may process the condition information to determine perishable item 130b's state and generate the notification. However, if perishable item 130b is not on a shopping list stored to communication device 110b for user 102b, communication device 110b may forego generating a notification. Similarly, if perishable item 130b is on a shopping list for user 102a with communication device 110a, user 202a may be notified that user 202a should visit aisle 262b and purchase perishable item 130b.

User 102c is viewing aisle 262c having perishable items 130c-e. A detector tag and/or wireless beacon 140b may communicate condition information to user 102c so that user 102c may view notifications about the states of perishable items 130c-e. For example, perishable items 130c-e may correspond to meat, where user 102c may not immediately be able to perceive whether the meat is still good for consumption. Thus, using communication device 110c, user 102c may view notifications informing user 102c which of perishable items 130c-e to purchase. Perishable item 130c may have recently expired, while perishable item 130d is set to expire in 2 days, and perishable item 130e was just recently offered for sale and will expire in one week. Thus, user 102c may be warned not to purchase perishable item 130c as it is expired and potentially dangerous. However, perishable item 130d may be discounted due to it close expiration date. If user 102c desires to cook perishable item 130d immediately after purchase, user 102c may choose to purchase perishable item 130d with the discount. However, if user 102c is planning a meal in a few days, user 102c may select item 130d for purchase based on the state of perishable item 130d.

Moreover, the condition information for perishable items 130c-e may be communicated to merchant devices 150a and 150b. A merchant employee 204a may view merchant device 150a and view a list of states and/or notifications for perishable items 130c-e. Merchant employee 204a may determine that perishable item 130c expired before an expiration date because aisle 262c did not properly keep perishable item 130c cool Thus, merchant employee 204a may service aisle 262c to prevent further spoilage and waste of perishable items. A merchant employee 204b nearby aisle 262c may also be informed about the expiration of perishable item 130c and the upcoming expiration of perishable item 130d based on the condition information for perishable items 130c and 130d. Merchant employee 204b may then remove perishable item 130c from display and may place perishable item 130d in the front of a display case for aisle 262c in order to promote sale of perishable item 130d before the expiration date.

User 102d may have selected perishable item 130f for purchase that is discounted based on detected conditions, such as an upcoming expiration date. User 102d may receive the discount through a notification on communication device 110d. Thus, when user 102d brings a cart 270 to a checkout 266, perishable item 130f may be scanned by merchant employee 204c using merchant device 150c. Merchant device 150c may receive the condition information for perishable item 130f from a detector tag of perishable item 130f. Merchant device 150c may then populate the discount after processing the condition information. In other embodiments, user 102d may present or communication the notification to merchant employee 204c using communication device 110d.

Figure 3A:
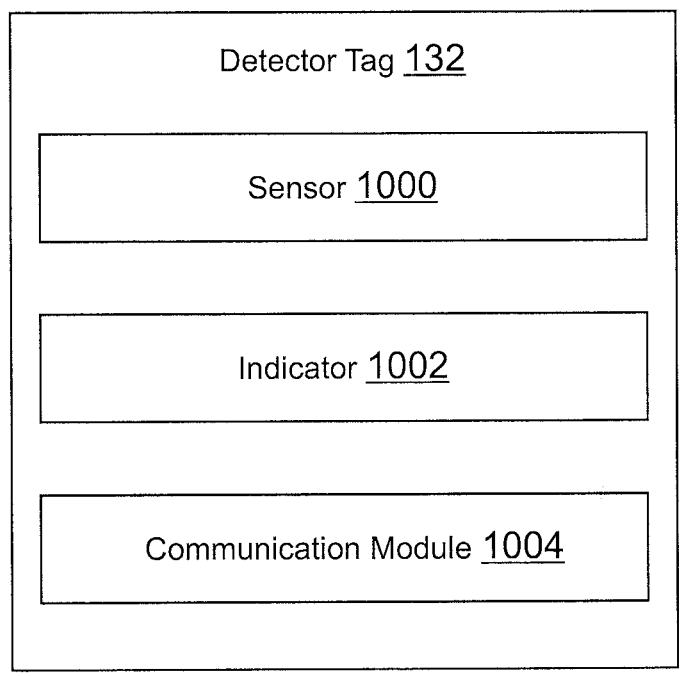
FIG. 3A is an exemplary detector tag using to detect one or more conditions for an associated perishable item, according to an embodiment.

FIG. 3A is an exemplary detector tag using to detect one or more conditions for an associated perishable item, according to an embodiment. FIG. 3A includes detector tag 132 of FIG. 1, which may be utilized to detect and/or collect condition information for one or more perishable items using the specialized hardware modules shown in FIG. 3A. The below described modules execute functions as described herein with respect to environment 100.

Detector tag 132 includes a sensor 100, an indicator 1002, and a communication module 1004. As discussed herein, sensor 1000 may correspond to any device used to detect a condition of a perishable item associated with detector tag 132. In this regard, sensor 1000 may correspond to a chemical sensor, a light sensor (e.g., a photo detector), a temperature sensor (e.g., a thermometer or thermistor), a pressure sensor, a moisture or liquid sensor, a hardness sensor, and/or a timer. Sensor 100 may be configured to detect conditions for a perishable item, such as chemical making up and/or emitted by the perishable item, ambient light around the perishable item, a temperature of the perishable item or surround the perishable item, pressure and/or moisture surround this perishable item (e.g., in a container for the perishable item), a firmness or hardness of the perishable item, and/or an amount of time the perishable item has existed or until a certain date associated with the perishable item.

Sensor 1000 may provide data output, or may alter detector tag 132 in such a way as to change detector tag 132. For example, sensor 1000 may alter indictor 1002. Indicator may be a physical portion of detector tag 132 that changes in response to a detected condition by sensor 1000. Indicator 1002 may change color in response to the detection of the condition. Indicator 1002 may also change another nonvisible or difficult to perceive feature of detector tag 132 in response to the detection of the condition. In such embodiments, detector tag 132 may change in chemical makeup, structure, or other feature. In certain embodiments, detector tag 132 may not include an indicator. Detector tag 132 may communicate detection of the condition (e.g., the condition information) by sensor 1000 using communication module 1004. Communication module 1002 may communicate the condition information using an antenna or other wired or wireless communication means. Sensor 1002 may provide data to communication module 1002, or may alter communication module 132, such as by affecting a frequency of response of the antenna.

Figure 3B:
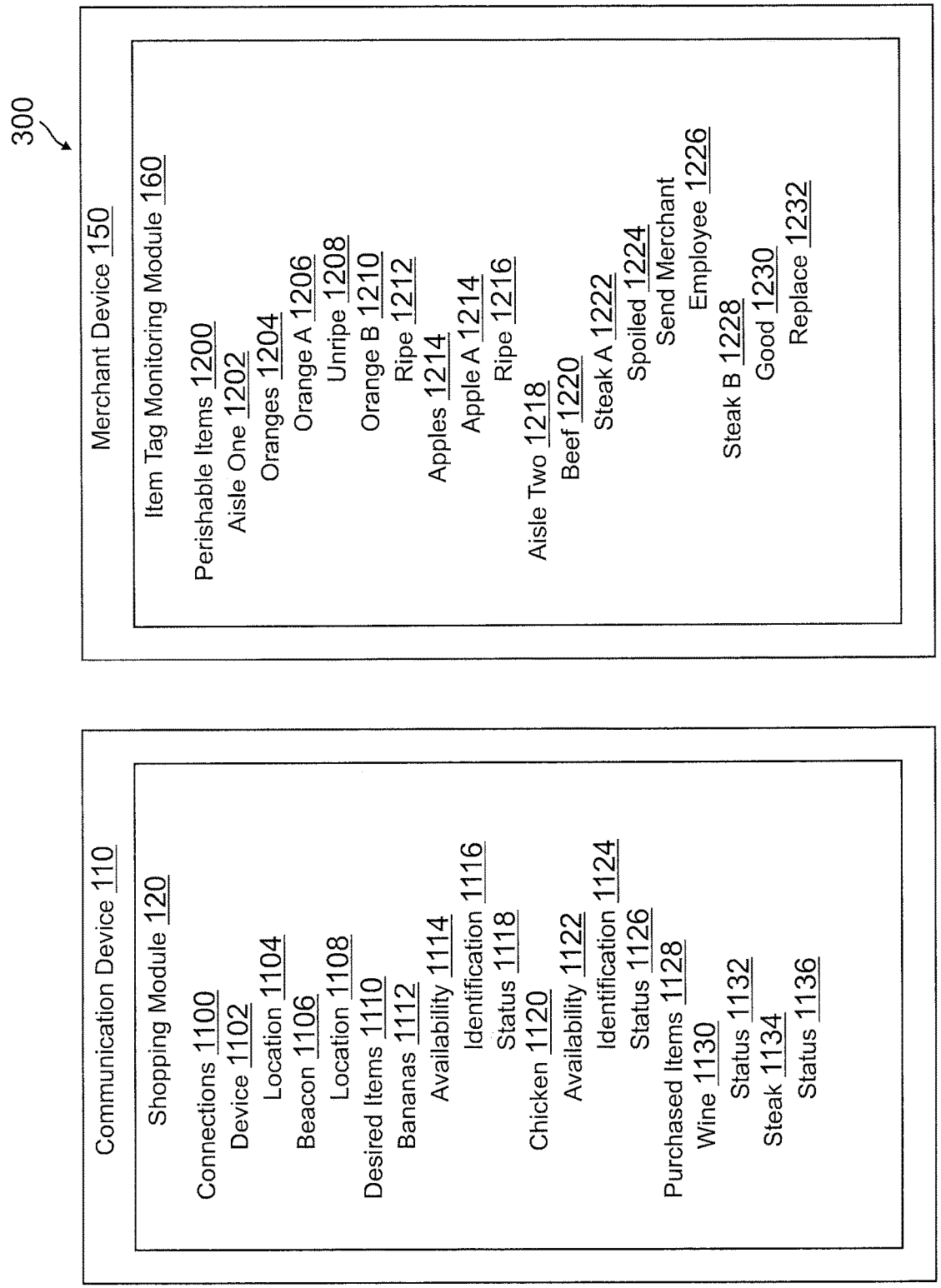
FIG. 3B is an exemplary system environment showing a user's communication device and a merchant's device receiving and processing condition information from one or more detector tags, according to an embodiment.

FIG. 3B is an exemplary system environment showing a user's communication device and a merchant's device receiving and processing condition information from one or more detector tags, according to an embodiment. Environment 300 includes communication device 110 and merchant device 140 of FIG. 1. The below described hardware and/or software modules execute functions as described herein with respect to environment 100.

Communication device 110 executes shopping module 120 having specialized hardware and/or software modules and processes described herein in reference to FIG. 1. In this regard, shopping module 120 displays notifications for perishable items for which communication module has receive condition information and determined a state. For example, shopping module 120 first include connections 1100, which may be managed by a user (not shown) of shopping module 1100 to receive condition information. Connections 1100 include a device 1102, such as a merchant device at a location 1104. Connections 1100 further include beacon 1106 at a location 1108 (e.g., a merchant location).

Shopping module 120 may further include the notifications based on information received from connections 1100 and/or detector tags based on information in a shopping list of desired items. Shopping module 120 includes desired items 1110 having bananas 1112 that the user wishes to purchase and are available at location 1104/location 1108. After receiving condition information, shopping module 1112 may determine availability 1114, which may indicate that bananas 1112 are available at location 1104/1108, as well as identification of bananas 1112 (e.g., a number/location) and status 1118 (e.g., a state of bananas 1112, such as ripe, unripe, etc.). Desired items 1110 further includes chicken 1120, which also includes an availability 1122 having identification 1124 (e.g., a name, number, code, and/or location allowing for retrieval of chicken 1120) and status 1126 (e.g. an expiration date). Shopping module 120 may also display previously purchased items so that the user may be informed about the status of previously purchased items that may expire. Thus, purchased items 1128 may include wine 1130 having status 1132 (e.g., good/bad/expired based on detected information, such as a storage temperature and/or ambient light) and steak 1134 having status 1136 (e.g., an amount of time until steak 1134 is expired, whether steak 1134 was improperly stored and/or contaminated).

Merchant device 150 executes an item tag monitoring module 160 having specialized hardware and/or software modules and processes described herein in reference to FIG. 1. In this regard, item tag monitoring module 160 includes displayable information elements for one or more states of one or more perishable items. Item tag monitoring module 160 may also include notifications to alert a merchant or merchant employee (not shown) of a state of a perishable item. For example, item tag monitoring module 160 includes perishable items 1200 having perishable items in an aisle one 1202 and an aisle two 1218 allowing for identification of where the perishable items are in attention is required. Perishable items in aisle one 10202 include oranges 1204 and applies 1214. Oranges 1204 include an orange A 1206 that includes a state of unripe 1208 while orange B 1206 includes a state of ripe 1212. The merchant or merchant employee may then more prominently display orange B 1206 for purchase. Similarly, apples 1214 include an apple A 1214 having a state of ripe 1216.

In aisle two 1218, beef 1220 includes a steak A 1222 available in aisle two 1218 and a steak B 1228 available in aisle two 1218. Steak A 1222 is shown as spoiled 1224. Since steak A 1222 has a state of spoiled 1224, an option may appear to send merchant employee 1226, for example, to the location of steak A 1222 to remove steak A 1222 from sale. In various embodiments, item tag monitoring module 160 may also include the condition information that gave rise to the state of spoiled 1224 so that the merchant or merchant employee may fix or change factors that lead to the condition information (e.g., improper refrigeration). Conversely, steak B 1228 is shown with a state of good 1230. Item tag monitoring module 160 may display an option for replace 1232, which may further information the merchant employee to replace steak A 1222 with steak B 1228.

Figure 4:
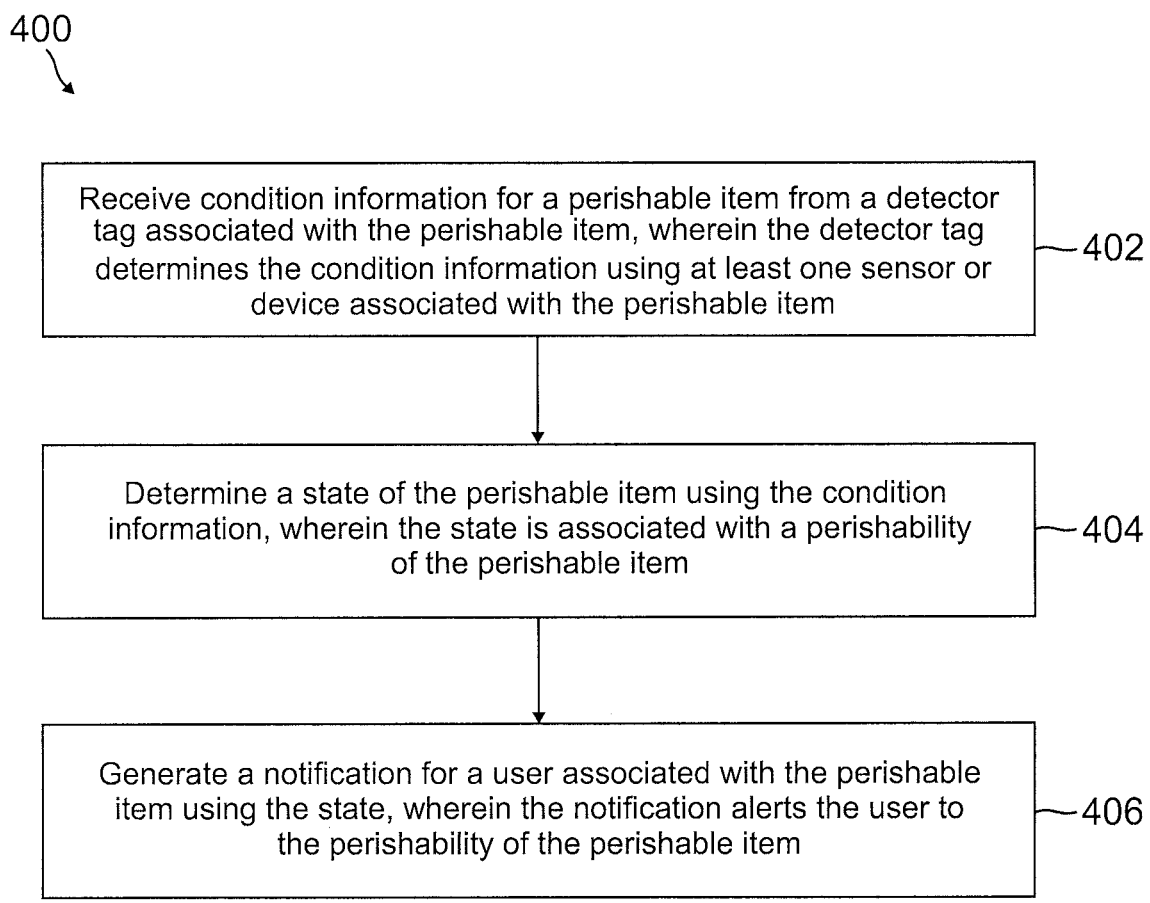
FIG. 4 is a flowchart of an exemplary process for detector tags to determine perishability of food items, according to an embodiment.

FIG. 4 is a flowchart of an exemplary process for detector tags to determine perishability of food items, according to an embodiment. Note that one or more steps, processes, and methods described herein may be omitted, performed in a different sequence, or combined as desired or appropriate.

At step 402, condition information for a perishable item is received, by a shopping module comprising at least one hardware processor, from a detector tag, wherein the detector tag determines the condition information using at least one sensor, and wherein the detector tag is associated with the perishable item. The condition information may comprise perishability information for the perishable item, for example, at least one of a chemical reading, a temperature reading, a pressure reading, a light reading, a hardness reading, and an amount of time. The perishable item may comprise one of a consumable, a chemical, a medicine, and an item with a limited shelf life.

The detector tag comprises a sensor and a second communication module, wherein the sensor collects the condition information from the perishable item and communicates the condition information using the second communication module. The detector tag may comprise an RFID tag, wherein the second communication module comprises an antenna, and wherein the second communication module communicates the condition information to at least one of a communication module of a communication device or merchant device and a wireless beacon connected to the communication module using short range wireless radio frequency communications. The detector tag may also comprise a wireless beacon, and wherein the wireless beacon communicates the condition information to at least one of a communication module of a communication device or merchant device and a wireless beacon connected to the communication module using one of near field communication, radio communication, infrared communication, Bluetooth communication, Bluetooth Low Energy (BLE) communication, LTE Direct communication, and WiFi communication.

Thus, the detector tag may communicate the condition information to a wireless beacon in a merchant location offering the perishable item for sale, wherein the wireless beacon communicates the condition information to the communication module of a communication device or merchant device. The wireless beacon may be established at a sub-location in the merchant location, wherein the sub-location presents the perishable item for sale at the sub-location. The sub-location may correspond to a type of item for sale comprising at least the perishable item. The wireless beacon may range limited to only connect to communication devices within or in proximity to the sub-location.

At step 404, a state of the perishable item is determined, by the module, using the condition information. The state may comprise a perishability rating for the perishable item. The perishability rating may comprise one of unripe, unready, ripe, ready, and spoiled. The state may also comprise a rating on a current physical condition of the perishable item related to consumption of the perishable item. A notification for a first user in proximity to the perishable item is generated, by the module, using the state of the perishable item, wherein the notification alerts the first user to the state of the perishable item, at step 406. An output device may communicate the notification to the first user. The notification may be further communicated to a device of a second user reviewing the perishable item if the physical condition of the perishable item indicated that the perishable item is at least one of inedible, dangerous, and undesirable.

The module may comprise a shopping module, wherein the shopping module comprises desirable items for the user, wherein the desirable items comprise one or a type, name, or brand of items matching the perishable item, and wherein the shopping module displays the notification with the state of the perishable item if the state of the perishable item indicates the perishable item is ready for consumption. The shopping module may display the notification with at least one of a location of the perishable item and an identification of the perishable item. In other embodiments, the module may comprise an item tag monitoring module, wherein the user comprises a merchant and a merchant employee, and wherein the item tag monitoring module displays the notification to at least one of the merchant and the merchant employee that reviews whether the perishable item is consumable or desired for consumption.

In different embodiments, notifications may be based on the user. For example, if the user's shopping list indicates the user is making a banana cream pie, overly ripe bananas may be preferable to ripe or soon to be ripe bananas, even though the user's preference is typically slightly under ripe bananas. In another example, one user may typically prefer green bananas, since the user likes to ripen bananas at home, while another user may prefer ripe bananas because that user typically likes to eat the bananas right away. As such, the first user may be notified of green bananas, while the other user may be notified of ripe bananas. Preferences and other information about the user can be received and/or processed when the user is in communication with beacons or other communication devices near the perishable item. Thus, the notifications may be based on specific user preferences/needs.

Figure 5:
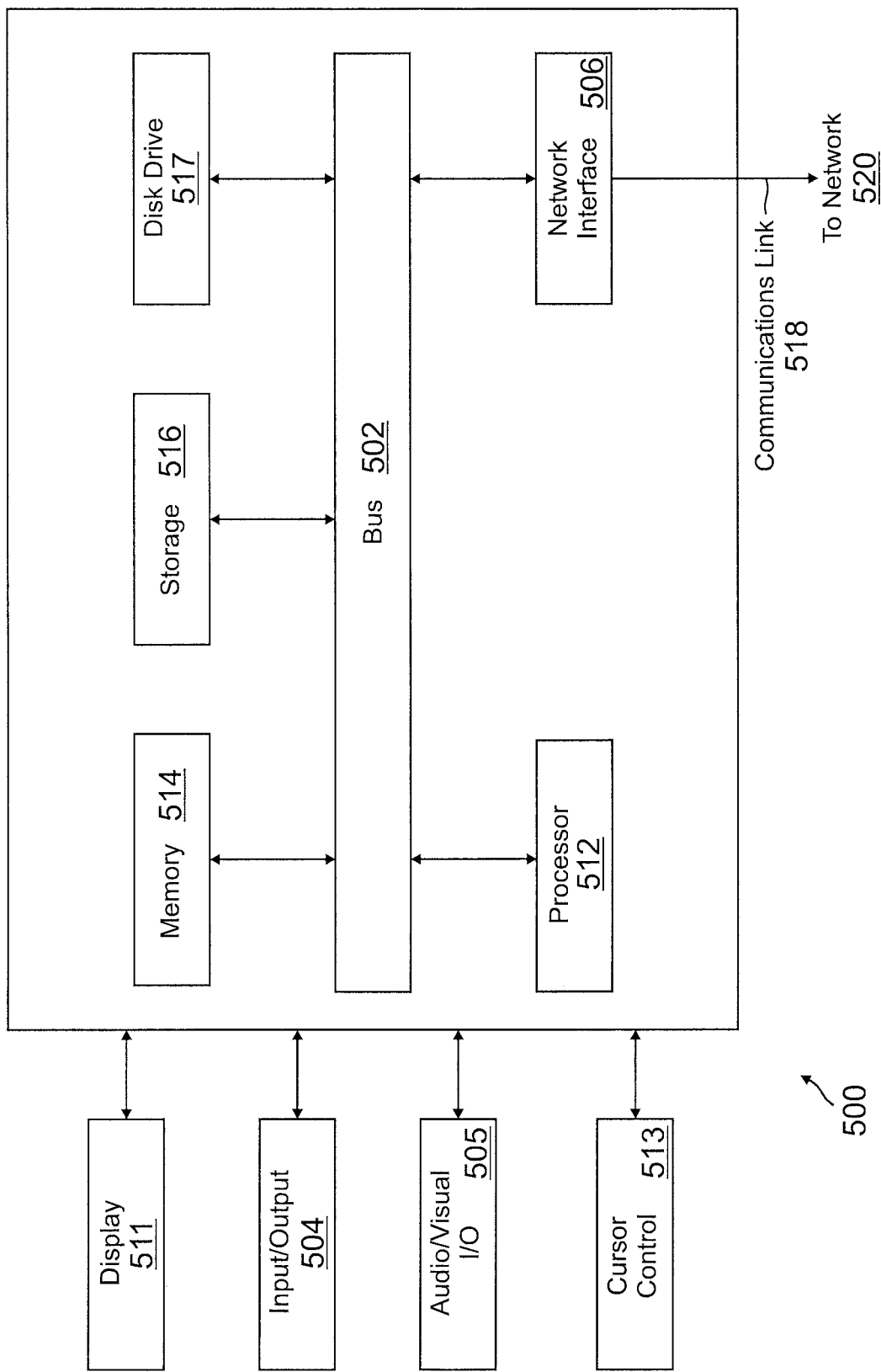
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via a network. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to network 520 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   accessing a list of items, wherein the list comprises a plurality of items and a first time period for a use of each of the plurality of items in the list;
   receiving condition information from a detector tag for a perishable item associated with the detector tag, wherein the condition information comprises current physical property data detected for the perishable item by the detector tag;
   receiving a change in the current physical property data of the perishable item, based on the condition information, over a second time period;
   determining a state of the perishable item using the condition information and the change;
   determining the perishable item matches one of the plurality of items from the list of items;
   determining the state of the perishable item indicates that the perishable item is ready for a purchase;
   in response to determining the state of the perishable item indicates that the perishable item is ready for the purchase, generating a first notification associated with the perishable item based on the first time period for the use of the one of the plurality of items;
   monitoring the state of the perishable item using the detector tag after the purchase of the perishable item by a user; and
   generating a second notification for the user when the state of the perishable item is associated with an expiration of the first time period after the purchase.

2. The system of claim 1, wherein the operations further comprise:
   communicating the first notification to a mobile device of the user.

3. The system of claim 1, wherein the condition information and the change from the perishable item are received via a sensor of the detector tag.

4. The system of claim 1, wherein the condition information comprises perishability information for the perishable item, and wherein the state comprises a perishability rating for the perishable item.

5. The system of claim 4, wherein the perishability rating comprises one of unripe, unready, ripe, ready, or spoiled.

6. The system of claim 3, wherein the condition information is received by at least one of the system or a wireless beacon connected to the system through short range wireless radio frequency communications.

7. The system of claim 3, wherein the condition information is received by at least one of the system or a second wireless beacon connected to the system through one of near field communication, radio communication, infrared communication, Bluetooth communication, Bluetooth Low Energy (BLE) communication, LTE Direct communication, or WiFi communication.

8. The system of claim 1, wherein the receiving the condition information from the detector tag is through a wireless beacon in a merchant location offering the perishable item for sale.

9. The system of claim 8, wherein the wireless beacon is at a sub-location in the merchant location, and wherein the perishable item is for sale at the sub-location.

10. The system of claim 9, wherein the sub-location corresponds to a type of item for sale comprising at least the perishable item.

11. The system of claim 9, wherein the system comprises a mobile device having a shopping application, wherein the shopping application stores information for the list of the items, wherein the list of the items further comprises one of a type, a name, or a brand of each of the items, and wherein the operations further comprise:
   displaying, through the shopping application, the first notification.

12. The system of claim 11, wherein the first notification is displayed with at least one of a location of the perishable item or an identification of the perishable item.

13. The system of claim 1, wherein the condition information is determined using a chemical reading of the perishable item, and wherein the current physical property data comprises the chemical reading.

14. The system of claim 1, wherein the operations further comprise:
   communicating the first notification to a merchant device for a merchant associated with the perishable item.

15. The system of claim 14, wherein the operations further comprise:
   causing the merchant device to display a merchant inventory list of perishable items including the perishable item with the state and the condition information.

16. The system of claim 1, wherein the perishable item is a medicine having a limited shelf life, and wherein the detector tag comprises a timer with a chemical sensor.

17. A method comprising:
   accessing a list of items, wherein the list comprises a plurality of items and a preference of a first time period for a use of each of the plurality of items in the list;
   determining, for a perishable item, condition information comprising current physical property data for the perishable item;
   receiving a change in the current physical property data of the perishable item over a second time period;

determining a state of the perishable item based on the condition information and the change;

determining the perishable item matches one of the plurality of items from the list of items;

determining the state of the perishable item indicates that the perishable item is ready for a purchase;

in response to determining the state of the perishable item indicates that the perishable item is ready for the purchase, generating an alert for the perishable item based on the preference for the first time period for the use of the one of the plurality of items;

outputting the alert to a user device;

monitoring the state of the perishable item after the purchase of the perishable item; and generating a notification when the state of the perishable item is associated with an expiration of the first time period after the purchase.

18. A non-transitory machine-readable medium comprising a plurality of machine-readable instructions executable to cause a machine to perform operations comprising:

accessing a list of items, wherein the list comprises a plurality of items and a preference of a first time period for a use of each of the plurality of items in the list;

receiving chemical information from a detector tag for a perishable item associated with the detector tag, wherein the chemical information comprises current chemical data detected by the detector tag of the perishable item;

receiving a change in the current chemical data of the perishable item, based on the chemical information, over a second time period;

determining a state of the perishable item based on the chemical information and the change;

determining the perishable item matches one of the plurality of items from the list of items;

determining the state of the perishable item indicates that the perishable item is ready for a purchase;

in response to determining the state of the perishable item indicates that the perishable item is ready for the purchase, generating a first notification associated with the state based on the preference for the first time period for the use of the one of the plurality of items;

monitoring the state of the perishable item using the detector tag after the purchase of the perishable item; and generating a second notification when the state of the perishable item is associated with an expiration of the first time period after the purchase.

19. The system of claim 1, wherein the operations further comprise:

determining the system is within a proximity range of the detector tag; and in response to determining the system is within a proximity range of the detector tag, displaying a notification associated with the detector tag and the list of the items.

20. The system of claim 1, wherein the operations further comprise:

transmitting the second notification to a mobile device of the user at the expiration.

\* \* \* \* \*